United States Patent [19]

Osajima et al.

[11] Patent Number: 4,943,552

[45] Date of Patent: Jul. 24, 1990

[54] PROCESS FOR PREPARING A GAS ABSORBENT

[75] Inventors: Yutaka Osajima; Katsumi Yamamura, both of Fukuoka; Yoshio Unno, Nagoya, all of Japan

[73] Assignee: Honshu Seishi Kabushiki Kaisha, Tokyo, Japan

[21] Appl. No.: 864,468

[22] Filed: May 19, 1986

[30] Foreign Application Priority Data

May 20, 1985 [JP] Japan ................. 60-107914

[51] Int. Cl.$^5$ .............. D01J 20/20; D01J 20/04
[52] U.S. Cl. ..................... 502/417; 502/426; 71/68; 71/128; 71/DIG. 1; 426/321; 426/323
[58] Field of Search ............ 71/68; 252/184; 502/418, 417, 423, 426

[56] References Cited

U.S. PATENT DOCUMENTS 4,831,011  5/1989  Oikawa et al. ................ 502/417

FOREIGN PATENT DOCUMENTS 48-7339   3/1973  Japan .
54-117060 9/1979  Japan .
54-138146 10/1979 Japan .
56-88752  7/1980  Japan .
88752     of 1981 Japan .
57-39149  8/1982  Japan .
58-98141  6/1983  Japan .
45965     of 1984 Japan .

*Primary Examiner*—Glennon H. Hollrah
*Assistant Examiner*—Kristina Lynne Konstas
*Attorney, Agent, or Firm*—Burns, Doane, Swecker & Mathis

[57] ABSTRACT

A novel process for preparing a gas absorbent, comprising the steps of adding sodium bromate to a mixture of sulfuric acid aqueous solution and active carbon, reacting them, separating solids from the reaction mixture, and drying said solids. The gas absorbent can be utilized as a reagent for preserving the freshness (inhibiting agent) of fruits, an inhibitor of flower withering, an inhibitor of bulb germinating and root sprouting, an inhibitor of plant withering, leaf falling or fruit falling, a reagent for controlling the growth and specialization of plants, a deodorant or an absorbent of organic compounds having double bonding or triple bonding.

16 Claims, No Drawings

PROCESS FOR PREPARING A GAS ABSORBENT

BACKGROUND OF THE INVENTION

1. Field of the Invention

The present invention relates to a process for preparing a gas absorbent which can absorb ethylene gas and the like, particularly to a process for preparing a gas absorbent which comprises active carbon treated with sodium bromate and has improved gas absorbency.

2. Description of the Prior Art

Up to now, normal active carbon and active carbon treated with water have been generally known as absorbents able to absorb and remove gases of every kind. However, when used as an absorbent, the absorbency of these active carbons reaches a limit in a short period because the active carbon absorbs water and the like together with ethylene. As a result, they cannot sufficiently absorb ethylene and the ethylene gas which has been absorbed escapes from them together with water.

Many improvements have been proposed toward overcoming the problems of the aforesaid active carbons as disclosed, for example, in Japanese Patent Publication No. 7339/1973, Japanese Patent Laid-Open Publication No. 117060/1979, Japanese Patent Laid-Open Publication No. 138146/1979 and Japanese Patent Publication No. 39149/1982, but no absorbent having sufficient physical properties has been realized yet.

On the other hand, the present inventors previously proposed an active carbon treated with potassium bromate as "a reagent for preserving freshness of vegetables" (Japanese Patent Laid-Open Publication No. 88752/1981) and "a gas absorbent and preparing method thereof" (Japanese Patent Laid-Open Publication No. 98141/1983). The aforesaid publication disclose absorbents with selective absorbency which do not suffer degradation of absorbency in the presence of steam and carbon dioxide.

Even though said absorbents have superior properties compared with the earlier active carbons, they at the same time have the following problems:
(a) the active carbon has to be treated in a treating solution at an elevated temperature because of the low solubility of potassium bromate.
(b) unless the temperature of the treating solution is kept high, the concentration of potassium bromate falls and, as a result, the ethylene removing ability of the absorbent obtained is weakened.
(c) gas which seems to be bromine is produced at elevated temperatures and impairs the working environment wrong, and, therefore special equipment for maintaining a proper working environment has to be provided.
(d) preparation of a high quality absorbent is thus not easy.

SUMMARY OF THE INVENTION

An object of the present invention is to provide a process for easily preparing absorbent having good absorbing ability.

In view of the situation in the absorbent field, the inventors investigated various preparing processes. As a result, they first found that an absorbent comprising active carbon treated with sodium bromate in place of potassium bromate has excellent property. On the basis of this discovery, they filed Japanese Patent Application No. 45965/1984. Second, they found that an absorbent having even better absorbency can be produced by using sodium bromate and treating the active carbon using a specific operating procedure.

Namely, the present invention relates to a process for preparing gas absorbent, comprising the steps of adding sodium bromate to a mixture of sulfuric acid aqueous solution and active carbon, reacting them, separating solids from the reaction mixture and drying said solids.

DESCRIPTION OF THE PREFERRED EMBODIMENT

In the present invention, any commercially available active carbon can be used as the "active carbon", irrespective of the property differences among such active carbons. Active carbon of all kinds, in the form of powder, flake, particle, molded particle, solid, fiber, film and the like, produced by charring coconut husk, peat, wood, plastic and other raw materials can be used.

There is no limitation on the kind of sulfuric acid aqueous solution used in the present invention but it is preferred that the concentration of the sulfuric acid thereof be in the range of 1.1 to 1.7 N. This is because use of a sulfuric acid aqueous solution having a concentration in the above range has a tendency to produce a product having good ethylene absorbency.

In the present invention, the mixture is obtained by mixing said active carbon and sulfuric acid aqueous solution. Specifically, the mixture is prepared by, for example, pouring sulfuric acid on active carbon, or adding active carbon to sulfuric acid, with or without agitation.

Further, it is preferred that the weight ratio of the active carbon to water content of the sulfuric acid aqueous solution be 1:2-3.

Then sodium bromate is added to said mixture. The addition is preferably carried out while cooling the mixture so as to keep the temperature of the mixture at 55° C or lower, more preferably at 50° C or lower. Cooling may be conducted, for example, by cooling the wall of a mixing vessel with city water.

The sodium bromate may be added to the mixture while the mixture is being stirred.

The sodium bromate may be in the form of solid or an aqueous solution of an appropriately adjusted concentration. The amount of sodium bromate used should preferably be about 4 parts by weight or more against 10 parts by weight of active carbon since within this range a gas absorbent having a high degree of gas absorbency and exhibiting constant properties can be obtained.

The sodium bromate can be added to the mixture containing active carbon and sulfuric acid aqueous solution all at one time or slowly over a prescribed period. The latter method is preferred because it is facilitates control mixture temperature. In the case of the latter method adding sodium bromate slowly, the preferable addition period depends on the scale of the reaction and may be about 30 to 60 minutes. A method of mixing sulfuric acid, active carbon and sodium bromate at one time may be adopted.

In the process of the present invention, after the completion of the reaction and the discontinuation of cooling of the mixing vessel, the reaction mixture may be aged for a certain period as required. An aging of the product has a tendency to provide an absorbent having better gas absorbency. The period for aging should generally be about 2 to 5 hours.

In the present invention, after the addition of the sodium bromate or the aging of the reaction mixture, the product is obtained in solid form by separating the mixture containing the product into solids and liquid, whereafter the solid product is dried.

The drying may be carried out by air-drying the product obtained by the solid-liquid separation of the reaction mixture and heat-drying the dried product obtained by air-drying. Specifically, air-drying may be carried out over 24 hours and heat-drying may be carried out in the range of about 80° to 115° C. In particular, heat-drying is preferably conducted at a low temperature over a long time. Drying is preferably conducted until the water content of the obtained products reaches about 3% or less.

The product obtained by drying can be marketed as a gas absorbent either as is after being or processed into a desired form such as powder, particle, flake, granule or the like. The gas absorbent produced by the preparing method of the present invention can be used as a reagent for preserving the freshness (inhibiting aging) of fruits, an inhibitor of flower withering, an inhibitor of blub germinating and root sprouting, an inhibitor of plant withering, leaf falling or fruit falling, a reagent for controlling the growth and specialization of plants, and the like, and it can be also used as a deodorant or an absorbent of organic compounds having double bonding or triple bonding.

The following Examples illustrate the present invention.

EXAMPLE 1

10 liters of water was poured into a 20-liter reactor made of stainless steel, 697 g of 98% sulphuric acid was added to the water, the mixture thereof was agitated thoroughly, and then 3871 g of commercially available active carbon (CG610A produced by Futamura Kagaku) was added and the mixture was agitated. Then, 1749 g of sodium bromate was added slowly to the mixture while the reactor was cooled by city water to keep the temperature of the mixed solution in the reactor at 22° C or less. The addition of sodium bromate was completed in 60 minutes. The cooling was then stopped and the mixture was aged for an additional 180 minutes. Then solids obtained by separating off the liquid were dried at 100° C for 4 hours, whereby the gas absorbent of the present invention was obtained.

EXAMPLES 2-4

Similarly, in accordance with the procedure and the conditions of Example 1 but using 35° C (Example 2), 47° C (Example 3) and 53° C (Example 4) as the maximum temperature of the mixed solution while adding sodium bromate, there was obtained gas absorbents according to the present invention.

COMPARATIVE EXAMPLE 1

10 liters of water was poured into a 20-liter reactor made of stainless steel. 697 g of 98% sulphuric acid was added to the water, the mixture thereof was agitated thoroughly, and then 3871 g of commercially available active carbon (CG610A produced by Futamura Kagaku) was added and the mixture was agitated. Then, 1935. g of potassium bromate was added slowly to the mixture while the reactor was cooled by city water to keep the temperature of the mixed solution in the reactor at 35° C or less. The addition of potassium bromate was completed in 60 minutes. The cooling was then stopped and the mixture was aged for an additional 180 minutes. Then solids obtained by separating off the liquid were dried at 100° C for 4 hours, whereby the gas absorbent of a comparative example was obtained.

COMPARATIVE EXAMPLES 2, 3

Similarly, in accordance with the procedure and the conditions of Comparative example 1 but using 47° C (Comparative example 2) and 53° C (Comparative example 3) as the maximum temperature of the mixed solution while adding potassium bromate, there was obtained gas absorbents of Comparative examples.

COMPARATIVE EXAMPLE 4

Commercially available active carbon (CG610A produced by Futamura Kagaku) was used as a gas absorbent.

EXAMPLE 5

The gas absorbents of the present invention obtained in Examples 1-4 and the gas absorbents obtained in Comparative examples 1-3 and the ordinary active carbon (CG610A produced by Futamura Kagaku) were subjected to an ethylene absorption test. The results obtained are shown in Table 1.

Method of testing ethylene absorbency 1 gram of a sample of a gas absorbent was placed in each of a number of 130 ml flasks having a sealed stopper and the flasks were maintained at 30° C. Ethylene gas was passed into an another 130 ml flask containing water and the water was displaced by the ethylene gas. Then the flask was sealed. 2.5 ml of the ethylene gas was taken from the flask containing ethylene and passed into the flask containing the sample. This procedure was repeated four times. Then, 0.5 ml of the gas in the flask containing the sample was collected 20, 40, 60, 90 or 120 minutes after the fourth introduction of ethylene had been completed. The residual amount of ethylene gas was measured by gas-chromatography and the result was calculated as a percentage on the basis of the amount of introduced ethylene gas (10 ml).

TABLE 1

| Absorbent | | Max. Temp. °C. | Residual ethylene (%) | | | | | Gas absorbent Water (%) |
|---|---|---|---|---|---|---|---|---|
| | | | 20 min | 40 min | 60 min | 90 min | 120 min | |
| Example | 1 | 22 | 0.1745 | 0 | 0 | 0 | 0 | 1.3 |
| | 2 | 35 | 0.2543 | 0.0011 | 0.0001 | 0 | 0 | 1.3 |
| | 3 | 47 | 0.2816 | 0.0003 | 0 | 0 | 0 | 1.4 |
| | 4 | 53 | 1.1342 | 0.3806 | 0.1743 | 0.0226 | 0.0011 | 1.3 |
| Comparative example | 1 | 35 | 2.1932 | 0.9022 | 0.2154 | 0.0336 | 0.0143 | 1.3 |
| | 2 | 47 | 3.2029 | 1.0988 | 0.4087 | 0.1986 | 0.0328 | 1.2 |
| | 3 | 53 | 4.0243 | 1.2019 | 0.8084 | 0.4124 | 0.2019 | 1.2 |

TABLE 1-continued

| Absorbent | Max. Temp. °C. | Residual ethylene (%) | | | | | Gas absorbent Water (%) |
| --- | --- | --- | --- | --- | --- | --- | --- |
| | | 20 min | 40 min | 60 min | 90 min | 120 min | |
| | 4 | 98.7357 | 98.5239 | 98.4012 | 98.3648 | 98.4826 | 2.4 |

The present invention is characterized by adding sodium bromate to a mixture of sulfuric acid aqueous solution and active carbon and has the following conspicuous advantages:

(1) In accordance with the present invention, even though active carbon is treated with sulfuric acid and sodium bromate at a low temperature, for example at 55° C, a gas absorbent having a higher degree of absorbency and higher absorbing velocity than those up to now can be obtained.

(2) The present invention has advantages in that it facilitates control in large scale production because no bromine gas or the like is produced when sodium bromate is added and, therefore, safety and each of maintaining the environment during production is better than in conventional methods and no special protecting equipment or apparatuses are not required.

(3) The present invention provides a safer process than those used up to now in which active carbon is treated with oxides, because harmful materials such as bromine gas, bromine solution, potassium permanganate and the like are not used.

(4) The gas absorbent obtained by the process of the present invention is safe from the point of the food sanitation because it does not produce any harmful materials when used.

We claim:

1. A gas absorbent, prepared by adding sodium bromate to a mixture of sulfuric acid aqueous solution and active carbon, reacting them, separating solids from the reaction mixture, and drying said solids.

2. The gas absorbent of claim 1 wherein the sodium bromate is in the form of a solid or aqueous solution.

3. The gas absorbent of claim 1 wherein the addition of the sodium bromate is carried out while cooling the mixture of sulfuric acid aqueous solution and active carbon.

4. The gas absorbent of claim 1 wherein the addition of the sodium bromate is carried out at 55° C or lower.

5. The gas absorbent of claim 1 wherein the concentration of the sulfuric acid aqueous solution is in the range of 1.1 to 1.7 N.

6. The gas absorbent of claim 1 wherein said active carbon is in the form of powder, flake, particle, molded particle, solid, fiber or film.

7. The gas absorbent of claim 1 wherein said active carbon is produced by charring coconut husk, peat, wood, plastics or other raw materials.

8. The gas absorbent of claim 1 wherein said mixture of sulfuric aqueous solution and active carbon is obtained by pouring sulfuric acid on active carbon or adding active carbon to sulfuric acid.

9. The gas absorbent of claim 1 wherein the weight ratio of acid active carbon to water content of said sulfuric acid solution is 1:2-3.

10. The gas absorbent of claim 1 wherein the amount of the sodium bromate used is about 4 parts by weight or more against 10 parts by weight of active carbon.

11. The gas absorbent of claim 1 wherein said reaction mixture is aged prior to the solid-liquid separation thereof.

12. The gas absorbent of claim 11 wherein the aging period is about 2 to 5 hours.

13. The gas absorbent of claim 1 wherein said drying is carried out by air-drying the solid obtained by the solid-liquid separation of the reaction mixture and heat-drying the dried product obtained by air-drying.

14. The gas absorbent of claim 13 wherein said air-drying is carried out for 24 hours.

15. The gas absorbent of claim 13 wherein said heat-drying is carried out in the range of about 80° to 115° C.

16. The gas absorbent of claim 1 wherein said drying is conducted until the water content of the products obtained by drying reaches about 3% or less.

* * * * *